United States Patent
Kim (10) Patent No.: US 7,042,522 B2
(45) Date of Patent: *May 9, 2006

(54) ADAPTIVE CONTRAST ENHANCEMENT METHOD USING TIME-VARYING NONLINEAR TRANSFORMS ON A VIDEO SIGNAL

(75) Inventor: Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 530 days.

This patent is subject to a terminal disclaimer.

(21) Appl. No.: 10/210,237

(22) Filed: Aug. 1, 2002

(65) Prior Publication Data

US 2003/0025838 A1    Feb. 6, 2003

(51) Int. Cl.
*H04N 5/52* (2006.01)

(52) U.S. Cl. ................ 348/671; 382/274; 348/678
(58) Field of Classification Search ........... 348/671, 348/678, 672, 673, 679, 683; 382/274; 345/690; 358/461

See application file for complete search history.

(56) References Cited

U.S. PATENT DOCUMENTS

| | | | | |
|---|---|---|---|---|
| 4,825,297 | A | * 4/1989 | Fuchsberger et al. | 358/447 |
| 5,724,158 | A | * 3/1998 | Koike | 358/462 |
| 5,862,254 | A | 1/1999 | Kim et al. | 382/168 |
| 5,923,383 | A | 7/1999 | Kim | |
| 5,963,665 | A | 10/1999 | Kim et al. | |
| 6,512,339 | B1 * | 1/2003 | Nakamura et al. | 315/383 |
| 2005/0036071 | A1 * | 2/2005 | Kim | 348/678 |

* cited by examiner

*Primary Examiner*—Michael H. Lee
(74) *Attorney, Agent, or Firm*—Michael Zarrabian, Esq.; Myers Dawes Andras & Sherman, LLP; Jeffrey P. Aiello

(57) ABSTRACT

The contrast of a time varying video signal is enhanced. Each digital picture is represented by samples having gradation levels in a range from a lower limit C to an upper limit U. The mean value of the gradation levels of the samples representing a first digital picture is determined. A first transform function is constructed in dependence on a distribution of samples with gradation levels less than or equal to the mean value. A second transform function is constructed in dependence on a distribution of the samples with gradation levels equal to or greater than the mean. The first transform function and the second transform function are used to form a contrast enhancement transform, which is preferably constructed in the form of a look-up table. The contrast enhancement transform is applied to a set of samples representing the first digital picture or representing the temporally subsequent picture.

15 Claims, 5 Drawing Sheets

ADAPTIVE CONTRAST ENHANCEMENT METHOD USING TIME-VARYING NONLINEAR TRANSFORMS ON A VIDEO SIGNAL

BACKGROUND OF THE INVENTION

Field of the Invention

Modern digital video technology has significantly improved the video quality available in consumer products such as digital video disk (DVD) players and digital television (DTV) systems. This is especially evident when the video quality of DTV systems is compared to the video quality available in current analog TV systems. However, it should be noted that such digital video systems only enhance the video quality in terms of the signal to noise ratio (SNR) and the resolution. There are various other issues relating to video enhancement, such as, for example, contrast enhancement, brightness enhancement, and detail enhancement. Generally speaking, video enhancement processes consist of a collection of techniques that seek to improve the visual appearance of displayed video. These techniques primarily include gray level and contrast manipulation, noise reduction, edge crispening and sharpening, as can be seen for example, by referring to W. K. Pratt, *Digital Image Processing*, $2^{nd}$ ed., Wieley Interscience. In contrast to the image restoration problem, video or image enhancement methods neither increase the inherent information content in the data nor require mathematical modeling. In general, the basic operation involved in video enhancement is the manipulation of a given sequence of images so that its appearance on a display medium can be improved. Since quantifying the criterion for enhancement is difficult, a large number of video enhancement techniques are empirical and require interactive procedures to obtain satisfactory results.

Among the techniques available for video enhancement, contrast enhancement might be the most important one since it plays a fundamental role in how the overall appearance of an image will be perceived by a human being. It is well known that a human beings perception is sensitive to contrast rather than to absolute values themselves (see, for example, A. K. Jain, *Fundamentals of Digital Image Processing*, Prentice Hall, Englewood Cliffs, 1989). Hence, it is natural to enhance the contrast of an image in order to provide a image that will be better perceived by a human being.

Contrast enhancement pays attention to the overall appearance of a given image rather than to the local appearance such as edge crispening or peaking. Models of contrast, for example, the root law and the logarithmic law can be found in A. K. Jain. Applications of image enhancement by contrast manipulation have been used in various fields, for example, medical image processing, astronomical image processing, satellite image processing, infrared image processing, etc. For instance, histogram equalization is a useful method in X-ray image processing since it significantly enhances the details of an X-ray image, and thus enables one to easily detect a tumor.

Although several methods for contrast enhancement are available in the literature, their primary application is limited to still images. Hence, it is hard to find one that can be applied to a video sequence that inherently has a time-varying characteristic since direct applications of such methods may cause some visual artifacts such as unnatural appearance or over-enhancement. Hence, these methods of contrast enhancement can not be suitably used in consumer products providing video content in the form of a sequence of images, such as for example, TV.

SUMMARY OF THE INVENTION

It is accordingly an object of the invention to provide a method for adaptively enhancing the contrast of the images or pictures of a time varying video signal in accordance with the time-varying characteristics of the video signal.

With the foregoing and other objects in view there is provided, in accordance with the invention, a method for adaptively enhancing the contrast of a time varying video signal that includes a plurality of temporally ordered digital pictures. Each one of the digital pictures is represented by a set of samples. Each one of the samples has a gradation level in a range from a lower limit C to an upper limit U. A contrast enhancement transform including at least a first transform function and a second transform function is constructed by performing the steps of: a) for a first one of the digital pictures, selecting a first value between the lower limit C and the upper limit U; the first value is preferably the mean value of the gradation levels of the samples of the first one of the digital pictures; b) dividing the set of the samples representing the first one of the digital pictures into at least a first portion having samples with gradation levels not greater than the first value and a second portion having samples with gradation levels not less than the first value; c) selecting the first transform function in dependence on a distribution of the gradation levels in the first portion, and d) selecting the second transform function in dependence on a distribution of the gradation levels in the second portion.

The contrast of a digital picture is enhanced by applying the contrast enhancement transform to a set of samples representing the digital picture. The actual digital picture that is enhanced can be the first one of the digital pictures, and in this case the first one of the digital pictures is stored while constructing the enhancement transform.

Because of the high correlation between the gradation level distributions of two pictures that are temporally located close to each other, the enhancement transform that is constructed from the first one of the digital pictures can be applied to a subsequent digital picture, preferably the immediately subsequent digital picture, to enhance the contrast of the subsequent digital picture. In this case, in an analogous manner, the actual enhancement transform that will be applied to the first one of the digital pictures will have been obtained from the digital picture that temporally preceded the first one of the digital pictures. It should also be understood that in this case, the digital picture being used to construct the contrast enhancement transform need not be stored in order to subsequently apply the contrast enhancement transform to it, because the contrast enhancement transform will be applied to the subsequent digital picture. In both cases, however, the contrast enhancement transform will be adaptively changed in accordance with the distribution of the gradation levels of the samples representing the temporally ordered pictures of the time varying video signal. The contrast enhancement transform is preferably constructed in the form of a look-up table. The contrast enhancement transform enhances the contrast by increasing the dynamic range of the samples at least in certain ranges.

In accordance with an added feature of the invention, step a) includes: calculating a mean value m from the gradation level of all of the samples representing the first one of the digital pictures, and selecting the first value to be the mean value m.

In accordance with an additional feature of the invention, the method includes: selecting the digital picture, which is enhanced when performing the step of enhancing the contrast, as either the first one of the digital pictures or one of the digital pictures that is temporally subsequent with respect to the first one of the digital pictures.

In accordance with another feature of the invention, the digital picture that is enhanced when performing the step of enhancing the contrast is an immediately temporally subsequent picture with respect to the first one of the digital pictures.

In accordance with a further feature of the invention, the method includes: using the contrast enhancement transform to construct a look-up table for receiving input gradation levels in a range from the lower limit C to the upper limit U and for providing corresponding output gradation levels having an increased dynamic range in at least two regions as compared to corresponding regions of the input gradation levels; and performing the step of enhancing the contrast by applying the look-up table to the set of the samples and thereby inherently applying the contrast enhancement transform to the set of the samples.

In accordance with a further added feature of the invention, the step of constructing the contrast enhancement transform includes: performing the step of selecting the first transform function by constructing the first transform function from a first enhancement function varying as a function of gradation level, equaling zero at the lower limit C, equaling zero at the first value, and having only one extreme value in a range from the lower limit C to the first value; and performing the step of selecting the second transform function by constructing the second transform function from a second enhancement function varying as a function of gradation level, equaling zero at the first value, equaling zero at the upper limit U, and having only one extreme value in a range from the first value to the upper limit U.

In accordance with a further additional feature of the invention, the step of constructing the contrast enhancement transform includes: choosing the first enhancement function to be non-negative in a region from the lower limit C to the first value; selecting a first gain function that monotonically increases as a function of a first distribution ratio, the first gain function equaling minus one when the first distribution ratio equals zero, and the first gain function equaling one when the first distribution ratio equals one; choosing the second enhancement function to be non-negative in a region from the first value to the upper limit U; selecting a second gain function that monotonically increases as a function of a second distribution ratio, the second gain function equaling minus one when the second distribution ratio equals zero, and the second gain function equaling one when the second distribution ratio equals one; defining a second value by determining a value of a gradation level for which the first enhancement function is at the extreme value thereof; defining a third value by determining a value of a gradation level for which the second enhancement function is at the extreme value thereof; obtaining the first distribution ratio by dividing a number of samples in the set of the samples having gradation levels in a range from the lower limit C to the second value by a number of samples in the set having gradation levels in a range from the lower limit C to the first value; obtaining the second distribution ratio by dividing a number of samples in the set having gradation levels in a range from the first value to the third value by a number of samples in the set having gradation levels in a range from the first value to the upper limit U; evaluating the first gain function at the first distribution ratio to obtain a first gain constant; evaluating the second gain function at the second distribution ratio to obtain a second gain constant; constructing the first transform function by multiplying the first enhancement function by the first gain function; and constructing the second transform function by multiplying the second enhancement function by the second gain function.

In accordance with yet an added feature of the invention, the step of constructing the contrast enhancement transform includes: when the first enhancement function is chosen to be non-negative in a region from the lower limit C to the first value, then selecting a first gain function that monotonically increases as a function of a first distribution ratio, the first gain function equaling minus one when the first distribution ratio equals zero, and the first gain function equaling one when the first distribution ratio equals one; when the second enhancement function is chosen to be non-negative in a region from the first value to the upper limit U, then selecting a second gain function that monotonically increases as a function of a second distribution ratio, the second gain function equaling minus one when the second distribution ratio equals zero, and the second gain function equaling one when the second distribution ratio equals one; when the first enhancement function is chosen to be non-positive in the region from the lower limit C to the first value, then selecting the first gain function to monotonically decrease as a function of the first distribution ratio, the first gain function equaling one when the first distribution ratio equals zero, and the first gain function equaling minus one when the first distribution ratio equals one; when the second enhancement function is chosen to be non-positive in the region from the first value to the upper limit U, then selecting the second gain function to monotonically decrease as a function of the second distribution ratio, the second gain function equaling one when the second distribution ratio equals zero, and the second gain function equaling minus one when the second distribution ratio equals one; defining a second value by determining a value of a gradation level for which the first enhancement function is at the extreme value thereof; defining a third value by determining a value of a gradation level for which the second enhancement function is at the extreme value thereof; obtaining the first distribution ratio by dividing a number of samples in the set of the samples having gradation levels in a range from the lower limit C to the second value by a number of samples in the set having gradation levels in a range from the lower limit C to the first value; obtaining the second distribution ratio by dividing a number of samples in the set having gradation levels in a range from the first value to the third value by a number of samples in the set having gradation levels in a range from the first value to the upper limit U; evaluating the first gain function at the first distribution ratio to obtain a first gain constant; evaluating the second gain function at the second distribution ratio to obtain a second gain constant; constructing the first transform function by multiplying the first enhancement function by the first gain function; and constructing the second transform function by multiplying the second enhancement function by the second gain function.

In accordance with yet an additional feature of the invention, the method includes: selecting the first enhancement function to be $K_l(x-C)(m-x)$, where $K_l$ is a constant and x is an input sample; and selecting the second enhancement function to be $K_u(m-x)(x-U)$, where $K_u$ is a constant.

In accordance with yet a further feature of the invention, the method includes: choosing $K_l$ to be not greater than $1/(m-C)$; and choosing $K_u$ to be not greater than $1/(U-m)$.

In accordance with yet a further added feature of the invention, the method includes: choosing $K_l$ to be $1/(m-C)$; and choosing $K_u$ to be $1/(U-m)$.

In accordance with a concomitant feature of the invention, the method includes: selecting the first gain function to be $2r_l-1$, where $r_l$ is the first distribution ratio; and selecting the second gain function to be $2r_u-1$, where $r_u$ is the second distribution ratio.

DESCRIPTION OF THE PREFERRED EMBODIMENTS

In the following discussion, it should be understood that the term, picture or image, is used to denote one picture of series of pictures of a video sequence. Let $f_n(\cdot)$ denote a picture (frame or field) of an incoming video sequence at the time instant n, where it is assumed that the picture $f_n(\cdot)$ is composed of samples that will be enhanced. Each one of the samples represents a gradation level in the range $\{C, C+1, \ldots, U\}$, where C represents the darkest gradation level and U represents the brightest gradation level of a video system. In most video systems, typically $C=0$ and $U=255$, however, the actual values of C and U can vary depending on the application.

The first parameter (first value) of the disclosed algorithm is preferably the average brightness, or the mean m of the input video picture $f_n(\cdot)$. It is preferable to use the mean m, since good results are obtained with this parameter, however, it should be understood that another value deviating from the mean m could be used instead. Conceptually any one of a number of values between C and U could be used, however, it is preferable to use the mean or a value very close to the mean so that the average brightness will not be changed, or at least will not be changed significantly. This concept will be further described below. Now, let h(x) denote the probability density function (PDF) of $f_n(\cdot)$, where h(x) represents the number of the samples in $f_n(\cdot)$ whose gradation level equals x. By Definition, $$N = \sum_{x=C}^{U} h(x)$$

represents the total number of the samples in the input video picture $f_n(\cdot)$ to be enhanced. Then the mean of those samples can be computed as $$m = \sum_{x=C}^{U} x \cdot h(x)/N.$$

Alternatively, the mean m can be simply computed by summing up the gradation levels of the samples in the input video picture to be enhanced and dividing the result by N.

Based on the mean m, the input picture $f_n(\cdot)$ is virtually clustered into two sub-pictures: one is composed of the samples with gradation values less than or equal to the mean m, and the other one is composed of the samples with gradation values greater than or equal to the mean m. The following parameters are then computed, which are associated with the partial histograms of the clustered sub-pictures:

$$n_a = \sum_{x=C}^{M_l} h(x) \tag{1}$$

and $$n_b = \sum_{x=m}^{M_u} h(x) \tag{2}$$

where $M_l$ and $M_u$ are variables between C and m, and between m and U, respectively. Determining the values of $M_l$ and $M_u$ will be disclosed later in association with enhancement functions. Note that the parameters $n_a$ and $n_b$ represent the total numbers of samples whose gradation levels are in $(C, M_l)$ and $(m, M_u)$, respectively.

After calculating or estimating the parameters $n_a$ and $n_b$ of the incoming video picture, further parameters representing the respective sample distribution in the regions (C,m) and (m,U) are determined. A first distribution ratio $r_l$ and a second distribution ratio $r_u$ are determined as follows:

$$r_l = \frac{n_a}{N_l}, \text{ and } r_u = \frac{n_b}{N_u} \tag{3}$$

where $$N_l = \sum_{x=C}^{m} h(x) \text{ and } N_u = \sum_{x=m}^{U} h(x).$$

Note that $N_l$ and $N_u$ represent the total numbers of samples whose gradation levels are in (C,m) and (m,U), respectively.

Note also that $0 \leq r_l \leq 1$ and $0 \leq r_u \leq 1$ by definition. These parameters indicate how the respective samples are distributed in each region (C,m) and (m,U). For instance, a first distribution ratio of $r_l=1$ implies that the samples in the region (C,m) are only distributed in the subregion $(C, M_l)$, and to the contrary, $r_l=0$ implies that no samples in the region (C,m) are distributed in the subregion (C,$M_l$). The same analysis can be made for the value of the second distribution ratio $r_u$. The first distribution ratio $r_l$ and the second distribution ratio $r_u$ are used to set the values of a first gain function $g_l(r_l)$ and of a second gain function $g_u(r_u)$. The function and purpose of these gain functions will be discussed below.

Figure 1:
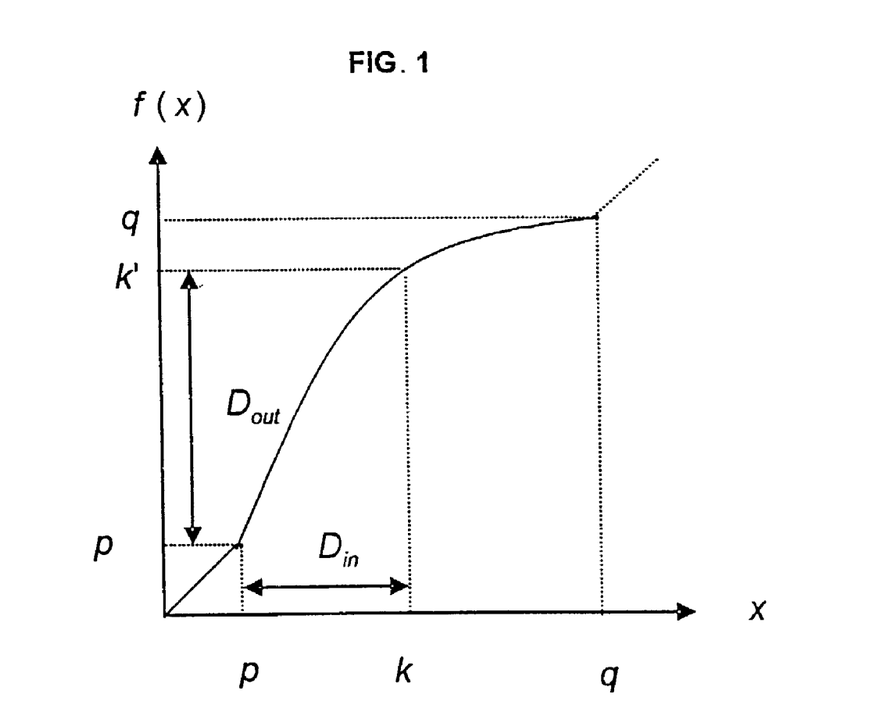
FIG. 1 shows an example of a transform that can be used to increase the dynamic range of samples having gradation levels within a certain range.

FIG. 1 shows a transform where x denotes the input gradation level of the input sample and $f(x)$ is the transformed output. This transform will be used to explain the concept behind the inventive enhancement method. In this particular example, it can be seen that gradation values in the region (p,k) are mapped to values in the region (p,k'). Importantly, the dynamic range $D_{in}$ for the samples whose gradation levels are in (p,k) has been increased to $D_{out}$ as a result of the transform. By using this transform, the overall contrast of the image can be enhanced if the input picture has more samples in the region (p,k) than in the region (k,q), since the dynamic range for those samples has been increased. Hence, the transform illustrated in FIG. 1 is suitable for enhancing the contrast when there are more samples distributed in region (p,k) than in region (k,q). On the other hand, if more samples are distributed in region (k,q) than in region (p,k), it is easy to see that a transform function such as that shown in FIG. 2 can be used to increase the overall contrast of the picture using the same rationale.

Figure 2:
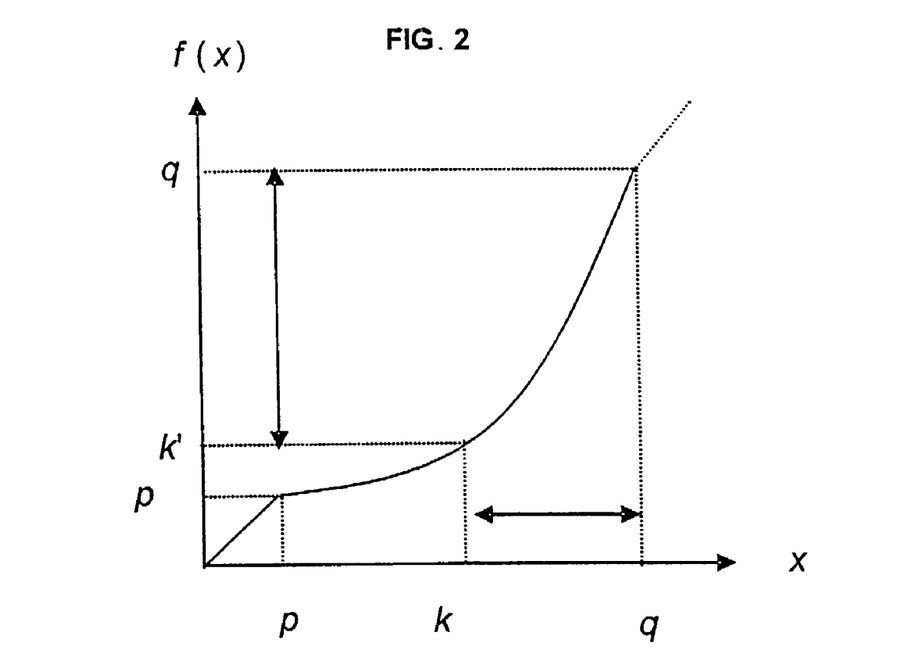
FIG. 2 shows an example of a transform that can be used to increase the dynamic range of samples having gradation levels within another range.

Adaptive contrast enhancement is possible by properly combining the transforms shown in FIGS. 1 and 2 in accordance with the sample distribution in (p,q) of the input picture of an incoming video sequence. Hence, it is the fundamental object behind the contrast enhancement method to adjust the transform function adaptively in accordance with the distribution of the gradation levels in the input picture in order to increase the overall contrast of the picture. The object of defining the first distribution ratio $r_l$ and the second distribution ratio $r_u$ in (3) is to be able to adjust the transform function for this purpose.

A first enhancement function $f_l(x)$ is defined over the region (C,m) and a second enhancement function $f_u(x)$ is defined over the region (m,U). The enhancement functions $f_l(x)$ and $f_u(x)$ are selected to be positive in their respective regions by imposing the following constraints:

1.

$$f_l(C)=f_l(m)=0, \text{ and } f_u(m)=f_u(U)=0,\qquad(4)$$

2.

For all real values x∈(C,m), $f_l(x)$ has only one
extreme value (either one local minima or one
local maxima) in (C,m), in other words, $$\frac{d}{dx}f_l(x) = 0$$

is satisfied only at $x=M_l$, where $$C<M_l<m,\qquad(5)$$

3.

For all real values x∈(m,U), $f_u(x)$ has only one
extreme value (either one local minima or one
local maxima) in (m,U), in other words, $$\frac{d}{dx}f_u(x) = 0$$

is satisfied only at $x=M_u$, where $$m<M_u<U,\qquad(6).$$

Figure 3A:
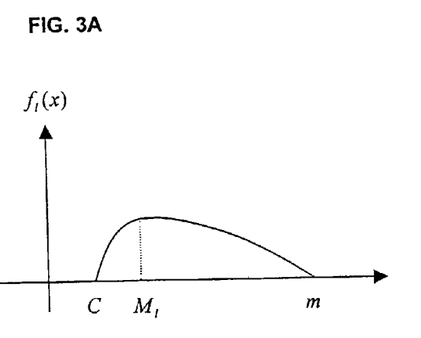
FIGS. 3A–3C show examples of enhancement functions.
Figure 3B:
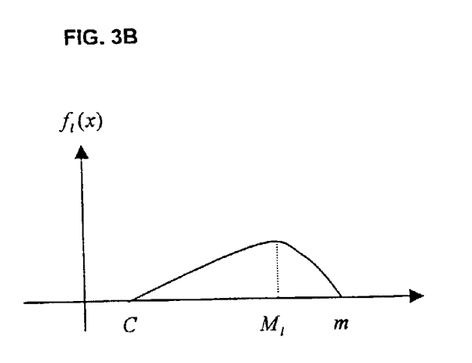
Figure 3C:
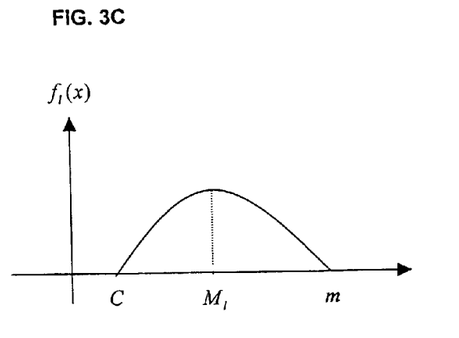

Any arbitrary enhancement functions can be used as long as the enhancement functions meet the constraints given in (4), (5), and (6). Some examples of the enhancement function, $f_l(x)$, satisfying the constraints given in (4), (5), and (6) are shown in FIGS. 3A–3C.

Note that $M_l$ and $M_u$ are associated with the clustering of the input picture to estimate the partial histograms that are defined in (1) and (2). Once the enhancement functions have been determined in dependence on the application, the values of $M_l$ and $M_u$ can then be obtained by determining the respective gradation levels for which $$\frac{d}{dx}f_l(x) = 0 \text{ and } \frac{d}{dx}f_u(x) = 0.$$

Note also that because of the condition given in (4), the values of $M_l$ and $M_u$ could be a function of m.

In order to adjust the gain of the enhancement functions $f_l(x)$ and $f_u(x)$ in accordance with the partial histogram distributions in the regions (C,m) and (m,U), respectively, the first gain function $g_l(r_l)$ and the second gain function $g_u(r_u)$ are defined. Note that the gain functions are functions of the first distribution ratio $r_l$ and the second distribution ratio $r_u$, respectively. Also note that the first distribution ratio $r_l$ and the second distribution ratio $r_u$ defined previously in (3) characterize the respective sample distributions in the regions (C,m) and (m,U). To achieve the object of the gain functions, two conditions are imposed on the gain functions:

1.

$$g_l(0)=g_u(0)=-1, \text{ and } g_u(1)=g_u(1)=1, \text{ and}\qquad(7)$$

2.

$g_l(r_l)$ is a monotonically increasing function with
respect to the first distribution ratio $r_l$, and
$g_u(r_u)$ is a monotonically increasing function
with respect to the second distribution ratio $r_u$,\qquad(8)

where it is assumed that the first enhancement function $f_l(x)$ and the second enhancement function $f_u(x)$ are non-negative in the regions (C,m) and (m,U), respectively. Hence, the value of the first gain function $g_l(r_l)$ will vary from −1 to 1 as the first distribution ratio $r_l$ varies from 0 to 1 and the value of the second gain function $g_u(r_u)$ will vary from −1 to 1 as the second distribution ratio $r_u$ varies from 0 to 1. Note that the role of the gain parameters is to adjust the enhancement functions in accordance with the sample distribution discussed in regard to FIGS. 1 and 2. Also note that while the values of the first gain function $g_l(r_l)$ and the second gain function $g_u(r_u)$ will vary from picture to picture, they will be constant values with respect to any one picture.

Figure 4A:
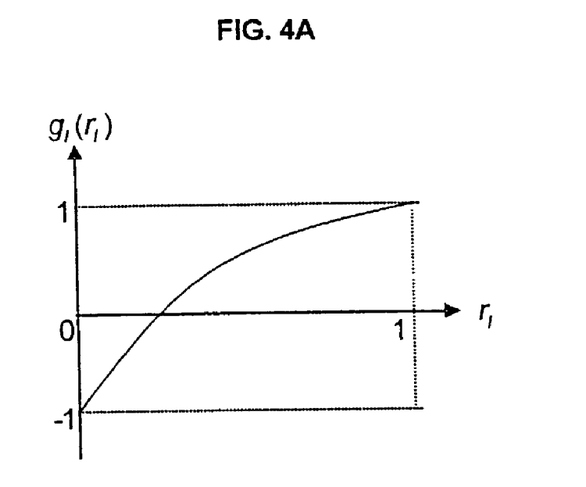
FIGS. 4A–4C show examples of gain enhancement functions.
Figure 4B:
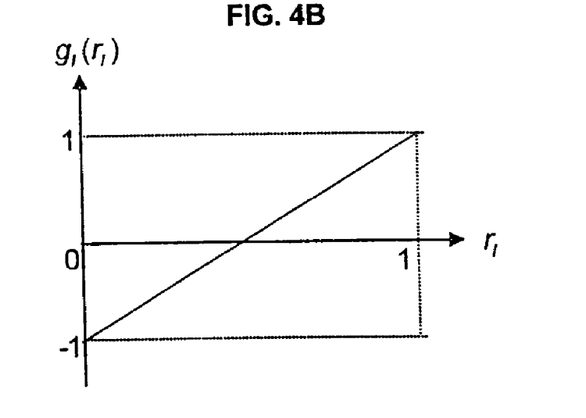
Figure 4C:
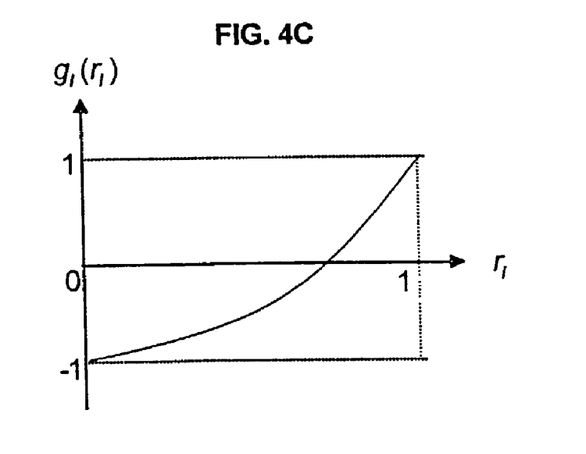

Any arbitrary gain function can be used as long as the gain functions meet the constraints in (7) and (8). Some examples of the gain function are illustrated in FIGS. 4A–4C.

It should be noted that if we assume that the first enhancement function $f_l(x)$ and the second enhancement function $f_u(x)$ are non-positive in the regions (C,m) and (m,U), respectively, the conditions given in (7) and (8) should be changed to:

1.

$$g_l(0)=g_u(0)=1, \text{ and } g_l(1)=g_u(1)=-1, \text{ and} \qquad (5)$$

2.

$g_l(r_l)$ is a monotonically decreasing function with respect to the first distribution ratio $r_l$, and $g_u(r_u)$ is a monotonically decreasing function with respect to the second distribution ratio $r_u$.

Based on the gain functions $g_l(r_l)$ and $g_u(r_u)$ and the enhancement functions $f_l(x)$ and $f_u(x)$ disclosed above, the following adaptive contrast enhancement transform can be obtained:

$$\psi(x) = \begin{cases} x + g_l(r_l) \cdot f_l(x), & C \le x \le m \\ x + g_u(r_u) \cdot f_u(x), & m \le x \le U. \end{cases} \qquad (9)$$

The adaptive contrast enhancement transform $\psi(x)$ includes a first transform function $g_l(r_l) \cdot f_l(x)$ and a second transform function $g_u(r_u) \cdot f_u(x)$. Note that the input gradation levels in (C,U) are changed by $g_l(r_l) \cdot f_l(x)$ if $x \in (C,m)$ and by $g_u(r_u) \cdot f_u(x)$ if $x \in (m,U)$. Note also that the maximum changes are made at $x = M_l$ and $x = M_u$, respectively. It should also be noted that the adaptive contrast enhancement transform $\psi(x)$ given in (9) maps m to m since we have restricted $f_l(m) = f_u(m) = 0$. This restriction is made so that the mean brightness of the transformed picture is not significantly changed compared to the mean brightness of the input picture.

It is important to note that the characteristics of the adaptive contrast enhancement transform $\psi(x)$ disclosed in (9) changes from picture to picture since the characteristics or the gradation level distribution of the video signal changes from picture to picture. To be specific, because the values of the mean m, the first distribution ratio $r_l$, and the second distribution ratio $r_u$ vary from picture to picture, the final form of the adaptive contrast enhancement transform $\psi(x)$ disclosed in (9) also varies from picture to picture. This ensures that the nature of the contrast enhancement method is adaptive.

Figure 5A:
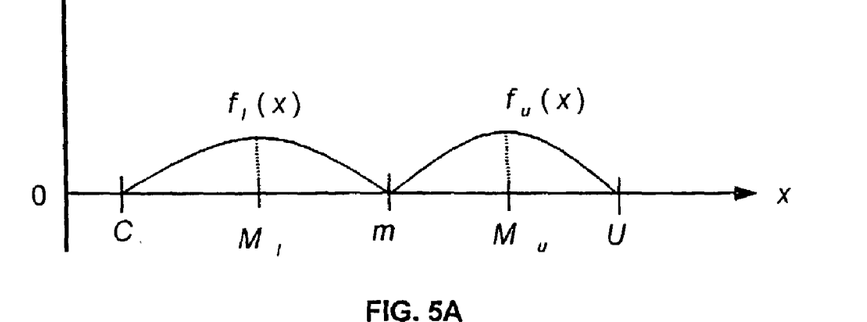
FIG. 5A shows an example of the enhancement functions $f_l(x)$ and $f_u(x)$.
Figure 5B:
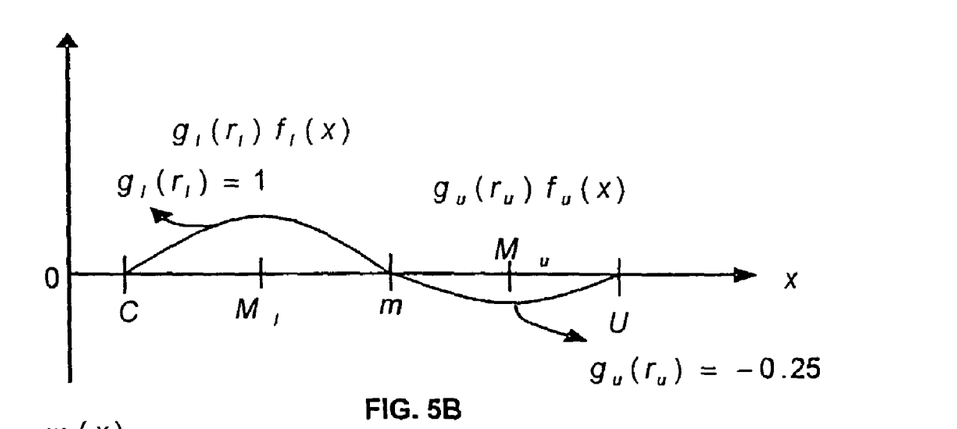
FIG. 5B shows a plot of $f_l(x) \cdot g_l(r_l)$ and $f_u(x) \cdot g_u(r_u)$.
Figure 5C:
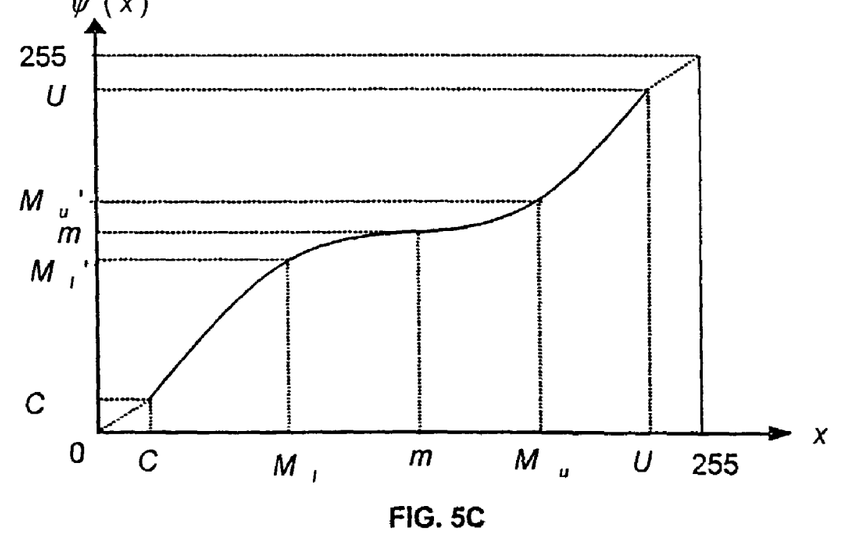
FIG. 5C shows a plot of then transform function that is obtained using the terms $f_l(x) \cdot g_l(r_l)$ and $f_u(x) \cdot g_u(r_u)$ shown in FIG. 5B.

FIGS. 5A–5C show an example in order to illustrate the operation of the adaptive contrast enhancement transform $\psi(x)$ given in (9). FIG. 5A illustrates an example of the first enhancement function $f_l(x)$ and the second enhancement function $f_u(x)$ which have maximum values at $x = M_l$ and $x = M_u$, respectively. FIG. 5B shows a plot of the terms, namely, $f_l(x) \cdot g_l(r_l)$ and $f_u(x) \cdot g_u(r_u)$, which are added to the input gradation levels using the adaptive contrast enhancement transform $\psi(x)$ given in (9). In this example, $g_l(r_l) = 1$ and $g_u(r_u) = -0.25$. Finally, FIG. 5C is a plot of the transform given in (9) which is ready to be applied to the input video. Keeping in mind the purpose of determining the first gain function $g_l(r_l)$ and the second gain function $g_u(r_u)$ with the conditions in (7) and (8), it should be noted that the dynamic range for the samples in the region $(C, M_l)$ has been increased to $(C, M_l')$ so that the samples will have more contrast than they had before the transform. Similarly, the samples in the region $(M_u, U)$ will have more contrast after the transform since the dynamic range has been increased to $(M_u', U)$ from $(M_u, U)$. As a consequence, the overall contrast of the image can be enhanced.

In summary, the contrast enhancement method based on the adaptive contrast enhancement transform $\psi(x)$ given in (9) can be described as follows:

1. Predetermine specific functional forms of $f_l(x)$, $f_u(x)$, $g_l(r_l)$ and $g_u(r_u)$ satisfying the respective conditions disclosed in (4)–(8);
2. Compute the PDF, h(x) of the incoming picture $f_n(\cdot)$ and at the same time compute the mean, m of the input picture;
3. Based on the mean and the PDF, estimate the parameters $n_a$ and $n_b$ in (1) and (2) relating to the clustered histogram;
4. From the parameters $n_a$ and $n_b$ compute the first and second distribution ratios ($r_l$ and $r_u$ in (3)). Then compute the first and second gain functions $g_l(r_l)$ and $g_u(r_u)$;
5. Once those parameters have been computed, use the adaptive contrast enhancement transform $\psi(x)$ given in (9) to construct the transform look-up table (LUT) for the gradation levels $x = C, \ldots, U$; and
6. Apply the LUT to the incoming video input signal.

Figure 6A:
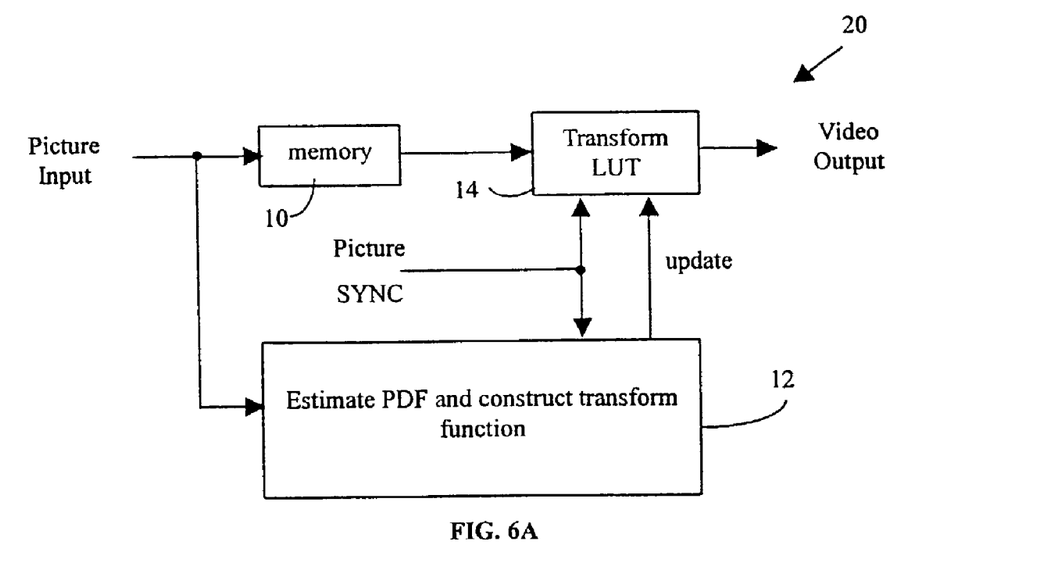
FIG. 6A is a block diagram of a first embodiment of a device for performing the adaptive contrast enhancement method.

FIG. 6A is a block diagram of a first embodiment of a device 20 for performing the adaptive contrast enhancement method. The incoming picture is stored in the memory 10 while the transform LUT is constructed using parameters obtained from the picture, as illustrated in functional block 12. The memory 10 is provided to delay the input video for one frame or field period so that the transform LUT can be applied to the picture that was used to construct the transform LUT, as shown in functional block 14.

Figure 6B:
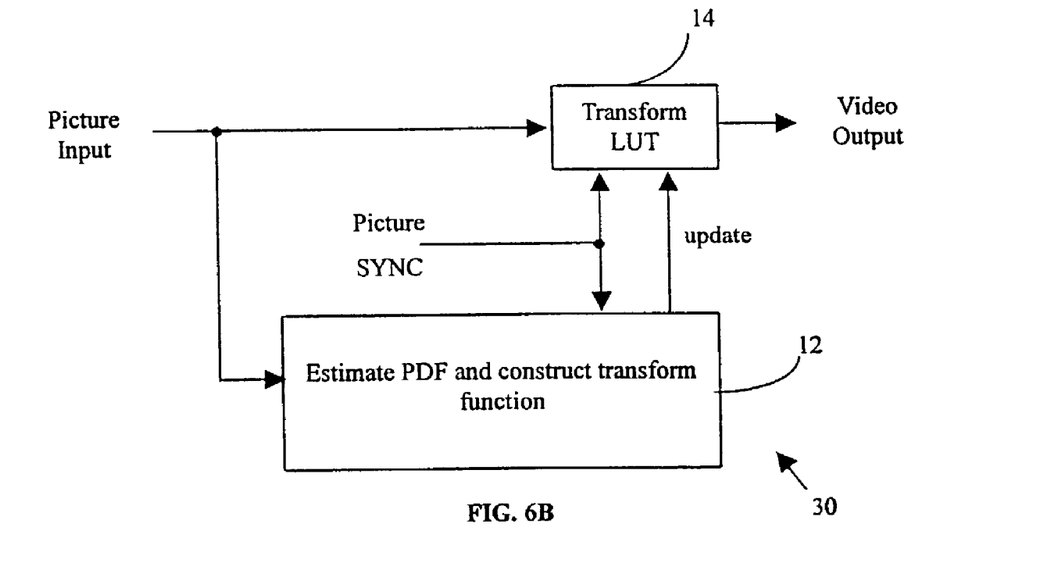
FIG. 6B is a block diagram of a second embodiment of a device for performing the adaptive contrast enhancement method.

A video sequence typically has a high correlation in the temporal direction, and therefore, in most applications, the LUT transform that is constructed from one picture can be applied to the subsequent picture in the video sequence. FIG. 6B is a block diagram of a second embodiment of a device 30 for performing the adaptive contrast enhancement method. The incoming picture is not stored in a memory while the transform LUT is constructed using the parameters that are obtained from the incoming picture. The transform that had been constructed from the previous picture in the video sequence is applied to this incoming picture. Similarly, the transform that is being constructed from this incoming picture will be applied to the subsequent picture in the video sequence. Applying the transform LUT to the input picture is a pixel by pixel operation that outputs $\psi(x)$ for the input pixel gradation level x. In both embodiments, the LUT transform can be updated in a manner that is synchronized with a picture SYNC signal.

The adaptive contrast enhancement method is based upon combining the enhancement functions $f_l(x)$, $f_u(x)$ with the adaptive gain adjusting functions $g_l(r_l)$ and $g_u(r_u)$, which depend on the sample distribution of the incoming picture. Again, any arbitrary functions can be used for $f_l(x)$, $f_u(x)$, $g_l(r_l)$ and $g_u(r_u)$ as long as they are subject to the conditions given in (4) thru (8).

For illustrative purposes, a specific embodiment of the method is described below. The first and second enhancement functions, used in the adaptive contrast enhancement transform $\psi(x)$ in (9) are provided as the following second order polynomials:

$$f_l(x) = K_l(x-C)(m-x) \qquad (10), \text{ and}$$

$$f_u(x) = K_u(m-x)(x-U) \qquad (11),$$

where $K_l$ and $K_u$ are pre-determined constants. Note that these functions satisfy the constraints specified in (4)–(6). It can be easily shown that $$\frac{d}{dx}f_l(x) = 0 \quad \text{and} \quad \frac{d}{dx}f_u(x) = 0$$

are only satisfied only when $$x = \frac{C+m}{2} \quad \text{and} \quad x = \frac{m+U}{2},$$

respectively. Hence $$M_l = \frac{C+m}{2} \quad \text{and} \quad M_u = \frac{m+U}{2}$$

for this case. Then the adaptive contrast enhancement transform ψ(x) given in (9) yields:

$$\psi(x) = \begin{cases} x + g_l(r_l) \cdot K_l(x-C)(m-x), & C \le x \le m \\ x + g_u(r_u) \cdot K_u(m-x)(x-U), & m \le x \le U. \end{cases} \quad (12)$$

As specified above, the selection of the first gain function $g_l(r_l)$ and the second gain function $g_u(r_u)$ satisfying the constraints given in (7) and (8) is versatile. In fact, different gain functions will result in different characteristics of ψ(x), and hence, the choice could vary depending on the specific application. A simple choice for the first gain function $g_l(r_l)$ and the second gain function $g_u(r_u)$ is as follows:

$$g_l(r_l) = 2 \cdot r_l - 1 \text{ and } g_u(r_u) = 2 \cdot r_u - 1. \quad (13)$$

Note that the embodiment of the first gain function $g_l(r_l)$ in (13) will equally treat the sample distributions in the sub-regions $(C, M_l)$ and $(M_l, m)$ because when the numbers of the samples in $(C, M_l)$ and $(M_l, m)$ are tied (i.e., $r_l = 0.5$), then $g_l(r_l) = 0$ for which the first part of the transform in (12) simply becomes "bypass". A similar discussion can be made for the embodiment of the second gain function $g_u(r_u)$ in (13).

One critical problem of directly applying the transform given in (12) is the gray inversion problem that can occur depending on the value of m. The gray inversion implies the following relation:

$$\psi(x_1) > \psi(x_2) \text{ for some } x_1 < x_2.$$

Using a simple algebraic manipulation of the following constraint:

$$\psi(x_1) < \psi(x_2) \overset{iff}{\longleftrightarrow} x_1 < x_2$$

in order to prevent the gray inversion problem, it can be easily shown that $K_l$ and $K_u$ must be bounded by:

$$K_l \le \frac{1}{m-C} \quad \text{and} \quad K_u \le \frac{1}{U-m}.$$

Hence, if we take the boundary values of $K_l$ and $K_u$, the transform given in (11) becomes:

$$\psi(x) = \begin{cases} x + g_l(r_l) \cdot \frac{(x-C)(m-x)}{m-C}, & C \le x \le m \\ x + g_u(r_u) \cdot \frac{(m-x)(x-U)}{U-m}, & m \le x \le U. \end{cases} \quad (14)$$

I claim:

1. A method for adaptive contrast enhancement, which comprises:

obtaining a time varying video signal including a plurality of temporally ordered digital pictures, each one of the digital pictures represented by a set of samples, each one of the samples having a gradation level in a range from a lower limit C to an upper limit U;

constructing a contrast enhancement transform including at least a first transform function and a second transform function by performing steps of:

a) for a first one of the digital pictures, selecting a first value between the lower limit C and the upper limit U, b) dividing the set of the samples representing the first one of the digital pictures into at least a first portion having samples with gradation levels not greater than the first value and a second portion having samples with gradation levels not less than the first value, c) selecting the first transform function in dependence on a distribution of the gradation levels in the first portion, and d) selecting the second transform function in dependence on a distribution of the gradation levels in the second portion; and enhancing contrast of a digital picture by applying the contrast enhancement transform to a set of samples representing the digital picture.

2. The method according to claim 1, wherein step a) includes:

calculating a mean value m from the gradation level of all of the samples representing the first one of the digital pictures, and selecting the first value to be the mean value m.

3. The method according to claim 1, which comprises:

selecting the digital picture, which is enhanced when performing the step of enhancing the contrast, from the group consisting of the first one of the digital pictures and one of the digital pictures that is temporally subsequent with respect to the first one of the digital pictures.

4. The method according to claim 1, wherein:

the digital picture that is enhanced when performing the step of enhancing the contrast is an immediately temporally subsequent picture with respect to the first one of the digital pictures.

5. The method according to claim 1, which comprises:

using the contrast enhancement transform to construct a look-up table for receiving input gradation levels in a range from the lower limit C to the upper limit U and for providing corresponding output gradation levels having an increased dynamic range in at least two regions as compared to corresponding regions of the input gradation levels; and performing the step of enhancing the contrast by applying the look-up table to the set of the samples and thereby inherently applying the contrast enhancement transform to the set of the samples.

6. The method according to claim 5, wherein step a) includes:
calculating a mean value m from the gradation level of all of the samples representing the first one of the digital pictures, and selecting the first value to be the mean value m.

7. The method according to claim 5, wherein the step of constructing the contrast enhancement transform includes:
performing the step of selecting the first transform function by constructing the first transform function from a first enhancement function varying as a function of gradation level, equaling zero at the lower limit C, equaling zero at the first value, and having only one extreme value in a range from the lower limit C to the first value; and
performing the step of selecting the second transform function by constructing the second transform function from a second enhancement function varying as a function of gradation level, equaling zero at the first value, equaling zero at the upper limit U, and having only one extreme value in a range from the first value to the upper limit U.

8. The method according to claim 7, wherein the step of constructing the contrast enhancement transform includes:
choosing the first enhancement function to be non-negative in a region from the lower limit C to the first value;
selecting a first gain function that monotonically increases as a function of a first distribution ratio, the first gain function equaling minus one when the first distribution ratio equals zero, and the first gain function equaling one when the first distribution ratio equals one;
choosing the second enhancement function to be non-negative in a region from the first value to the upper limit U;
selecting a second gain function that monotonically increases as a function of a second distribution ratio, the second gain function equaling minus one when the second distribution ratio equals zero, and the second gain function equaling one when the second distribution ratio equals one;
defining a second value by determining a value of a gradation level for which the first enhancement function is at the extreme value thereof;
defining a third value by determining a value of a gradation level for which the second enhancement function is at the extreme value thereof;
obtaining the first distribution ratio by dividing a number of samples in the set of the samples having gradation levels in a range from the lower limit C to the second value by a number of samples in the set having gradation levels in a range from the lower limit C to the first value;
obtaining the second distribution ratio by dividing a number of samples in the set having gradation levels in a range from the first value to the third value by a number of samples in the set having gradation levels in a range from the first value to the upper limit U;
evaluating the first gain function at the first distribution ratio to obtain a first gain constant;
evaluating the second gain function at the second distribution ratio to obtain a second gain constant;
constructing the first transform function by multiplying the first enhancement function by the first gain function; and
constructing the second transform function by multiplying the second enhancement function by the second gain function.

9. The method according to claim 7, wherein the step of constructing the contrast enhancement transform includes:
when the first enhancement function is chosen to be non-negative in a region from the lower limit C to the first value, then selecting a first gain function that monotonically increases as a function of a first distribution ratio, the first gain function equaling minus one when the first distribution ratio equals zero, and the first gain function equaling one when the first distribution ratio equals one;
when the second enhancement function is chosen to be non-negative in a region from the first value to the upper limit U, then selecting a second gain function that monotonically increases as a function of a second distribution ratio, the second gain function equaling minus one when the second distribution ratio equals zero, and the second gain function equaling one when the second distribution ratio equals one;
when the first enhancement function is chosen to be non-positive in the region from the lower limit C to the first value, then selecting the first gain function to monotonically decrease as a function of the first distribution ratio, the first gain function equaling one when the first distribution ratio equals zero, and the first gain function equaling minus one when the first distribution ratio equals one;
when the second enhancement function is chosen to be non-positive in the region from the first value to the upper limit U, then selecting the second gain function to monotonically decrease as a function of the second distribution ratio, the second gain function equaling one when the second distribution ratio equals zero, and the second gain function equaling minus one when the second distribution ratio equals one;
defining a second value by determining a value of a gradation level for which the first enhancement function is at the extreme value thereof;
defining a third value by determining a value of a gradation level for which the second enhancement function is at the extreme value thereof;
obtaining the first distribution ratio by dividing a number of samples in the set of the samples having gradation levels in a range from the lower limit C to the second value by a number of samples in the set having gradation levels in a range from the lower limit C to the first value;
obtaining the second distribution ratio by dividing a number of samples in the set having gradation levels in a range from the first value to the third value by a number of samples in the set having gradation levels in a range from the first value to the upper limit U;
evaluating the first gain function at the first distribution ratio to obtain a first gain constant;
evaluating the second gain function at the second distribution ratio to obtain a second gain constant;
constructing the first transform function by multiplying the first enhancement function by the first gain function; and
constructing the second transform function by multiplying the second enhancement function by the second gain function.

10. The method according to claim 9, wherein step a) includes:

calculating a mean value m from the gradation level of all of the samples representing the first one of the digital pictures, and selecting the first value to be the mean value m.

11. The method according to claim 10, which comprises:
selecting the first enhancement function to be $K_l(x-C)(m-x)$, where $K_l$ is a constant and x is an input sample; and
selecting the second enhancement function to be $K_u(m-x)(x-U)$, where $K_u$ is a constant.

12. The method according to claim 11, which comprises:
choosing $K_l$ to be not greater than $1/(m-C)$; and
choosing $K_u$ to be not greater than $1/(U-m)$.

13. The method according to claim 11, which comprises:
choosing $K_l$ to be $1/(m-C)$; and
choosing $K_u$ to be $1/(U-m)$.

14. The method according to claim 11, which comprises:
selecting the first gain function to be $2r_l-1$, where $r_l$ is the first distribution ratio; and
selecting the second gain function to be $2r_u-1$, where $r_u$ is the second distribution ratio.

15. The method according to claim 14, which comprises:
choosing $K_l$ to be $1/(m-C)$; and
choosing $K_u$ to be $1/(U-m)$.

* * * * *